(12) United States Patent
Okumura et al.

(10) Patent No.: US 8,215,809 B2
(45) Date of Patent: Jul. 10, 2012

(54) LIGHT CONTROL APPARATUS AND RECORDING MEDIUM

(75) Inventors: Kazuhisa Okumura, Kariya (JP); Ryu Mizuno, Kariya (JP)

(73) Assignee: Denso Corporation, Kariya (JP)

( * ) Notice: Subject to any disclaimer, the term of this patent is extended or adjusted under 35 U.S.C. 154(b) by 458 days.

(21) Appl. No.: 12/505,673

(22) Filed: Jul. 20, 2009

(65) Prior Publication Data

US 2010/0014302 A1   Jan. 21, 2010

(30) Foreign Application Priority Data

Jul. 18, 2008   (JP) ................................ 2008-187589

(51) Int. Cl.
*B60Q 1/00*   (2006.01)

(52) U.S. Cl. .................... 362/466; 362/523; 362/525

(58) Field of Classification Search .......... 362/465–468, 362/509, 523–526; 701/49; 315/77–83
See application file for complete search history.

(56) References Cited

U.S. PATENT DOCUMENTS

| | | | |
|---|---|---|---|
| 6,445,085 B1 | 9/2002 | Toda et al. | |
| 2004/0114382 A1 | 6/2004 | Sakai | |

FOREIGN PATENT DOCUMENTS

| | | |
|---|---|---|
| JP | 08-192673 | 7/1996 |
| JP | 09-315213 | 12/1997 |
| JP | 11-208366 | 8/1999 |
| JP | 2000-062524 | 2/2000 |
| JP | 2001-058539 | 3/2001 |
| JP | 2002-337599 | 11/2002 |
| JP | 2004-161082 | 6/2004 |
| JP | 2004-182195 | 7/2004 |

OTHER PUBLICATIONS

Japanese Office Action dated Sep. 7, 2010, issued in corresponding Japanese Application No. 2008-187589, with English translation.
Japanese Office Action dated Apr. 20, 2010, issued in corresponding Japanese Application No. 2008-187589, with English translation.

*Primary Examiner* — Stephen F Husar
*Assistant Examiner* — Meghan Dunwiddie
(74) *Attorney, Agent, or Firm* — Nixon & Vanderhye P.C.

(57) ABSTRACT

The present invention provides, as one aspect, a light control apparatus for controlling directions of optical axes of headlights mounted in a vehicle. The apparatus includes a position detecting section that detects positions of the headlights with respect to a road surface, an optical axis direction calculating section that calculates the directions of the optical axes of the headlights, individually, so that the optical axes are directed to illumination targets positioned at predetermined distances from the positions of the headlights detected by the position detecting section, a leveling control section that controls the directions of the optical axes of the headlights in the vertical direction, individually, and a leveling output section that outputs a control command based on a calculation result of the optical axis direction calculating section to the leveling control section.

8 Claims, 5 Drawing Sheets

Wc: POSITION OF THE CENTER OF GRAVITY OF VEHICLE
W: DISTANCE BETWEEN THE CENTER OF LEFT HEADLIGHT AND THE CENTER OF RIGHT HEADLIGHT
H1: HEIGHT OF POSITION OF HEADLIGHT WHEN ROLL IS NOT GENERATED

FIG.3B

H2L, H2R: HEIGHTS OF POSITIONS OF HEADLIGHTS WHEN ROLL IS GENERATED

LIGHT CONTROL APPARATUS AND RECORDING MEDIUM

CROSS REFERENCE TO RELATED APPLICATION

This application is based on and claims the benefit of priority from earlier Japanese Patent Application No. 2008-187589 filed Jul. 18, 2008, the description of which is incorporated herein by reference.

BACKGROUND OF THE INVENTION

1. Technical Field of the Invention

The present invention relates to a light control apparatus which controls the direction of the optical axis of a headlight and a recording medium in which a light control program is recorded.

2. Related Art

Conventionally, a light control apparatus has been known which detects a pitch angle, which is the inclination of a vehicle with respect to the front-back direction, and controls the direction of the optical axis of a headlight in the vertical direction depending on the pitch angle (leveling control). This kind of apparatus is disclosed in, for example, Japanese Patent No. 3721013.

However, the conventional light control apparatus described above is configured such that the directions of the optical axes of a left headlight and a right headlight are controlled in the same manner. Hence, when the vehicle inclines in the left-right direction, for example, during turning, heights of the positions of the left and right headlights become different from each other. This causes a difference between heights of the optical axes of the left and right headlights (in other words, the difference between illumination distances), which causes the driver of the vehicle discomfort.

SUMMARY OF THE INVENTION

The present invention has been made in consideration of the foregoing conventional situation, and an object of the present invention is to provide a light control apparatus which controls the directions of the optical axes of headlights so that even when the vehicle is inclined in the left-right direction, the difference between illumination distances of the left and right headlights is prevented, thereby preventing the driver of the vehicle from suffering discomfort due to the difference between heights of the optical axes of the left and right headlights.

In order to achieve the object, the present invention provides, as one aspect, a light control apparatus for controlling directions of optical axes of headlights mounted in a vehicle, comprising: a position detecting section that detects positions of the headlights with respect to a road surface; an optical axis direction calculating section that calculates the directions of the optical axes of the headlights, individually, so that the optical axes are directed to illumination targets positioned at predetermined distances from the positions of the headlights detected by the position detecting section; a leveling control section that controls the directions of the optical axes of the headlights in the vertical direction, individually; and a leveling output section that outputs a control command based on a calculation result of the optical axis direction calculating section to the leveling control section.

DETAILED DESCRIPTION OF THE PREFERRED EMBODIMENTS

Hereinafter, embodiments of the present invention will now be described in connection with the accompanying drawings.

(First Embodiment)

Figure 1:
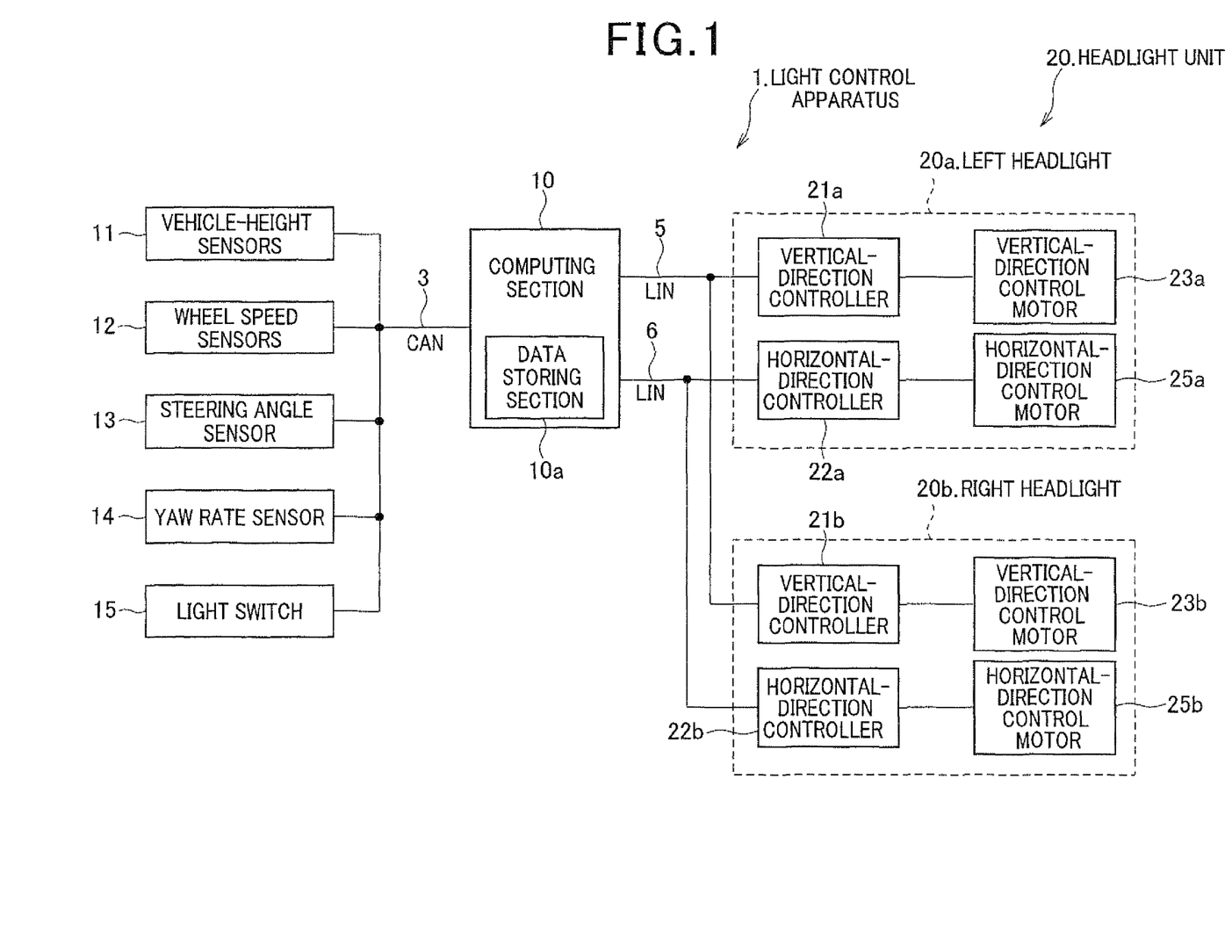
FIG. 1 is a block diagram schematically showing the configuration of a light control apparatus according to a first embodiment of the present invention.

FIG. 1 is a block diagram schematically showing the configuration of a light control apparatus 1 according to a first embodiment of the present invention.

The light control apparatus 1 is installed in a vehicle such as a passenger car. As shown in FIG. 1, the light control apparatus 1 comprises a computing section (computer) 10. The light control apparatus 1 further comprises vehicle-height sensors 11 (vehicle-height detecting means), wheel speed sensors 12, a steering angle sensor 13 (steering angle detecting means), a yaw rate sensor 14 (angular velocity detecting means), and a light switch (SW) 15, which are connected with the computing section 10 via a CAN (Controller Area Network) communication line 3 through which communication is performed by using the CAN communication protocol. The computing section 10 is also connected with a headlight unit 20 via two LIN (Local Interconnect Network) communication lines 5 and 6 through which communication is performed by using the LIN communication protocol.

The vehicle-height sensors 11 are disposed in the vicinity of, for example, a right front wheel and a right rear wheel, respectively. The vehicle-height sensors 11 detect the amount of expansion and contraction of suspension at each wheel to determine vehicle heights in the vicinity of the wheels. The vehicle-height sensors 11 then send the determined vehicle heights to the computing section 10 via the CAN communication line 3.

The wheel speed sensors 12 are known wheel speed sensors and are attached to, for example, a right front wheel and a left front wheel, respectively, to detect vehicle speeds (that is, traveling speeds). The wheel speed sensors 12 send the detected vehicle speeds to the computing section 10 via the CAN communication line 3.

The steering angle sensor 13 is configured by a known sensor which detects the steering amount of the steering wheel of the vehicle. The steering angle sensor 13 sends the detected steering amount (steering angle) to the computing section 10 via the CAN communication line 3.

The yaw rate sensor 14 is a known yaw rate sensor and detects angular velocity of the vehicle when the vehicle turns. The yaw rate sensor 14 sends the detected angular velocity to the computing section 10 via the CAN communication line 3. The light switch 15 is operated by the user of the light control apparatus 1 to turn on/off the headlight unit 20. The state of the light switch 15 (that is, whether the headlight unit 20 is in the ON state or in the OFF state) can be detected by the computing section 10.

The computing section 10 is configured by a known microcomputer including a CPU, a ROM, and a RAM. The computing section 10 further includes a data storing section 10a in which various kinds of information regarding the vehicle are stored. The information stored in the data storing section 10a includes the position of the center of gravity of the vehicle, the position of the headlight unit 20 with respect to the position of the center of gravity, and a map showing how the left-side vehicle height and the right-side vehicle height change depending on angular velocity of the vehicle when the vehicle turns.

The computing section 10 receives detection results from the sensors (the wheel speed sensors 12, the steering angle sensor 13, and the yaw rate sensor 14) via the CAN communication line 3. The computing section 10 performs a light control process (described later in detail) in which angles of the optical axes of headlights of the headlight unit 20 (hereinafter, simply referred to as "optical axes"), that is, illuminating angles are determined.

Then, the computing section 10 transmits control commands for specifying illuminating angles of the headlights to the headlight unit 20 via the LIN communication lines 5 and 6 so that the angles of actual optical axes of the headlights match the determined illuminating angles, The control command includes information regarding an illuminating angle such as information of an angle (leveling angle) formed in the vertical direction (up-down direction with respect to the travelling direction of the vehicle) and information of an angle (swivel angle) formed in the horizontal direction (left-right direction with respect to the travelling direction of the vehicle) which is perpendicular to the vertical direction, The illuminating angles determined by the computing section 10 are the differences from predetermined reference angles (which are, for example, the angle formed in the vertical direction by which the optical axis becomes parallel to the road surface and the angle formed in the horizontal direction by which the optical axis is directed to the travelling direction or the front direction of the vehicle). In the light control process, the computing section 10 determines the information regarding the illuminating angle formed in the horizontal direction based on the detection results of the wheel speed sensors 12 and the steering angle sensor 13.

The computing section 10 performs various processes including the light control process based on a program (light control program) recorded in the ROM (which is a computer readable recording medium).

The headlight unit 20 are, as known in conventional vehicles, configured by a left headlight 20a and a right headlight 20b, which are arranged on left-side portion and right-side portion of the front-side of the vehicle, respectively. The computing section 10 transmits control commands to the headlights 20a and 20b individually. That is, the computing section 10 can transmit a control command concerning an angle of the optical axis to one of the headlights 20a and 20b, or can transmit control commands concerning angles of the optical axes to both of the headlights 20a and 20b.

Each of the headlights 20a and 20b includes a light (not shown) made up of a xenon lamp, an LED, or the like. The configuration for making the light illuminate is not shown. The headlights 20a and 20b include, as shown in FIG. 1, vertical-direction controllers 21a and 21b (leveling control means), horizontal-direction controllers 22a and 22b (swivel control means), vertical-direction control motors 23a and 23b, and horizontal-direction control motors 25a and 25b, respectively.

The vertical-direction controllers 21a and 21b are connected with the LIN communication line 5. The vertical-direction controllers 21a and 21b receive information concerning a leveling angle from the computing section 10 via the LIN communication line 5. The horizontal-direction controllers 22a and 22b are connected with the LIN communication line 6. The horizontal-direction controllers 22a and 22b receive information concerning a swivel angle from the computing section 10 via the LIN communication line 6.

When the vertical-direction control motors 23a and 23b are driven, the optical axes of the headlights incline in the vertical direction in response. That is, the leveling control is performed. When the horizontal-direction control motors 25a and 25b are driven, the optical axes of the headlights incline in the horizontal direction in response to the drive. That is, the swivel control is performed.

The motors 23a, 23b, 25a, and 25b may be configured by, for example, stepping motors.

Each of the vertical-direction controllers 21a and 21b and the horizontal-direction controllers 22a and 22b is configured by a known microcomputer including a CPU, a ROM, and a RAM. The vertical-direction controllers 21a and 21b and the horizontal-direction controllers 22a and 22b drive the vertical-direction control motors 23a and 23b and the horizontal-direction control motors 25a and 25b, respectively, based on control commands from the computing section 10. That is, the vertical-direction controllers 21a and 21b and the horizontal-direction controllers 22a and 22b calculate the differences between current angles of the optical axes with respect to the reference angles and illuminating angles included in the control commands, based on the information regarding the illuminating angles included in the control commands from the computing section 10. The vertical-direction controllers 21a and 21b and the horizontal-direction controllers 22a and 22b transmit control signals for canceling the calculated differences to the vertical-direction control motors 23a and 23b and the horizontal-direction control motors 25a and 25b, respectively. In consequence of the process, actual angles of the optical axes are changed in accordance with the control commands from the computing section 10.

Figure 2:
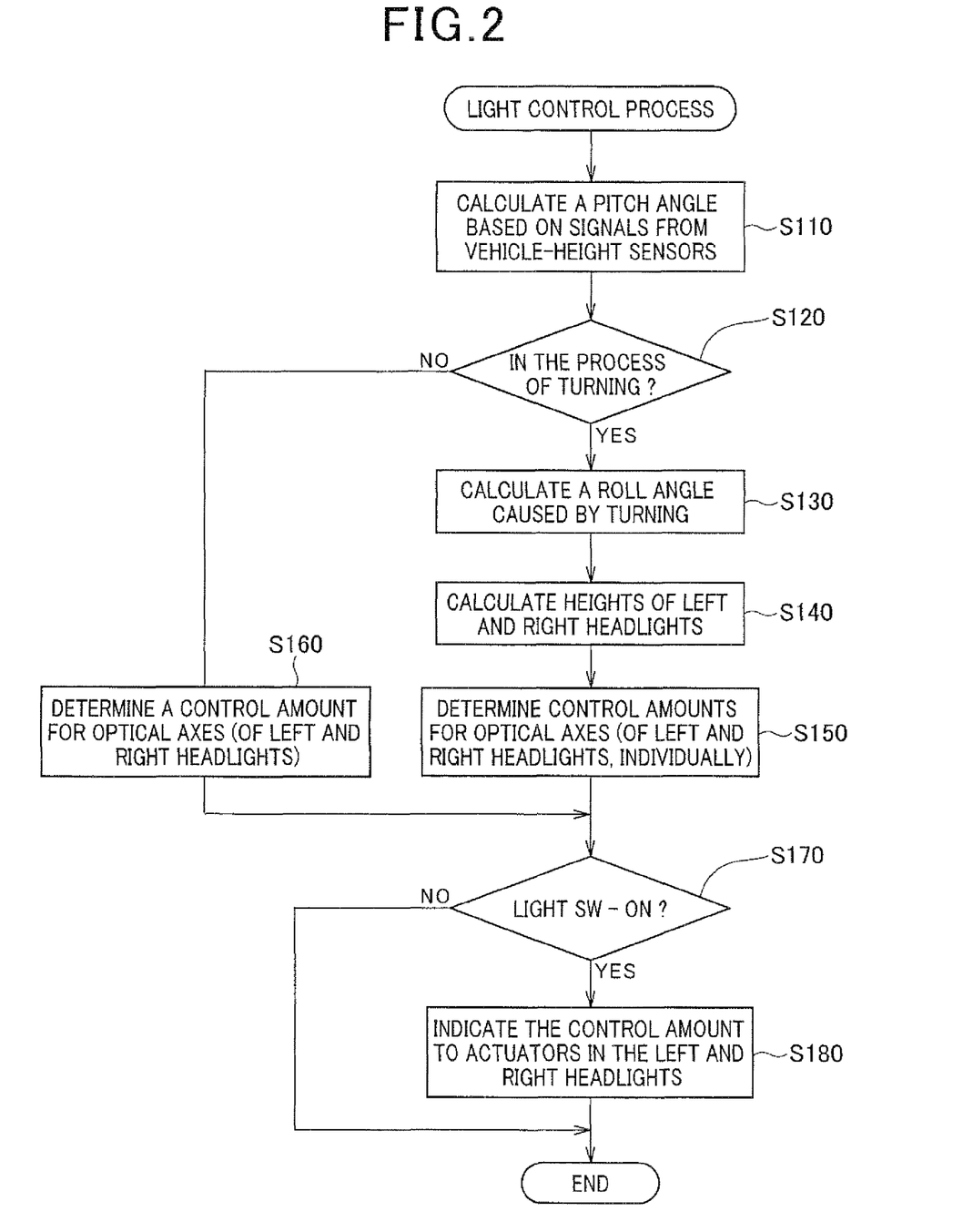
FIG. 2 is a flowchart showing the procedure of a light control process.

FIG. 2 is a flowchart showing the procedure of the light control process. Hereinafter, the light control process performed by the computing section 10 will be described with reference to FIG. 2.

The light control process starts when, for example, an ignition switch (not shown) is turned on. In step S110 (position detecting means, pitch angle detecting means), the computing section 10 obtains detection results by the vehicle-height sensors 11 and calculates a pitch angle, which is the inclination of the vehicle with respect to the front-back direction, based on the detection results. In this process, the computing section 10 determines the deference between vehicle heights of the right front wheel and the right rear wheel, and converts the deference into an angle to obtain a pitch angle.

In step S120 (position detecting means), the computing section 10 determines whether or not the vehicle is currently turning. Specifically, the computing section 10 determines that the vehicle is turning by considering all the detection results of the wheel speed sensors 12, the steering angle sensor 13, and the yaw rate sensor 14. For example, the computing section 10 determines that the vehicle is turning when all the vehicle speeds, steering angle, and yaw rate of the vehicle are not less than predetermined threshold values.

In step S130 (position detecting means, roll angle detecting means), the computing section 10 calculates a roll angle caused by the turning. The roll angle is estimated based on the detection result of angular velocity by the yaw rate sensor 14, a map stored in the data storing section 10a, and the like. The roll angle may be estimated by multiplying a value (constant or variable) determined based on steering angles, travelling speeds, elastic force of suspensions (spring constant), or the like of various vehicles by a value considering centrifugal force of the vehicle (which is proportional to the square of angular velocity).

In step S140 (position detecting means, vertical displacement detecting means), the computing section 10 calculates heights of the positions of the left headlight 20a and right headlight 20b. In step S150 (optical axis direction calculating means), the computing section 10 sets angles of the optical axes of the headlights 20a and 20b so that illumination distances of the headlights 20a and 20b become equal to each other.

Figure 3A:
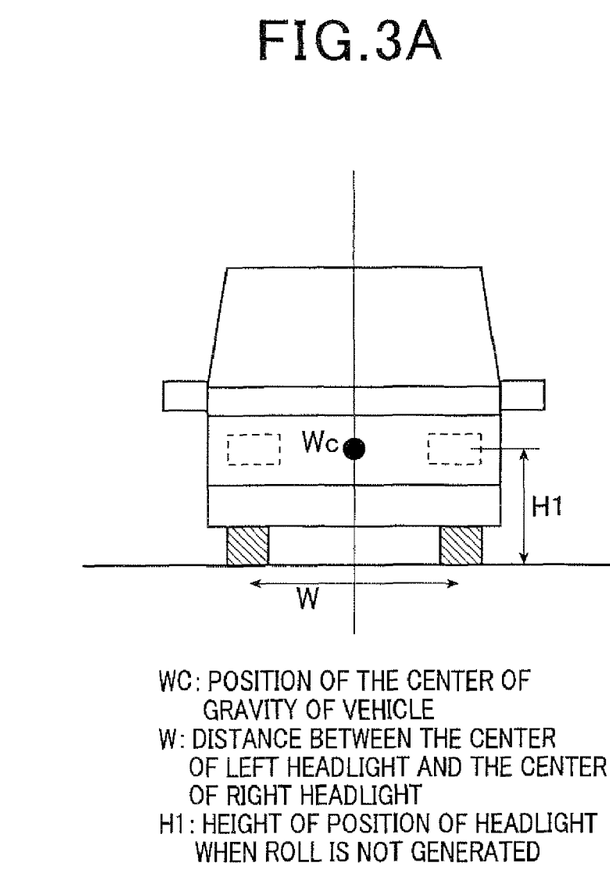
FIG. 3A is a diagram schematically showing a vehicle viewed from the rear side thereof when inclination (roll) of the vehicle is not generated in the left-right direction.
Figure 3B:
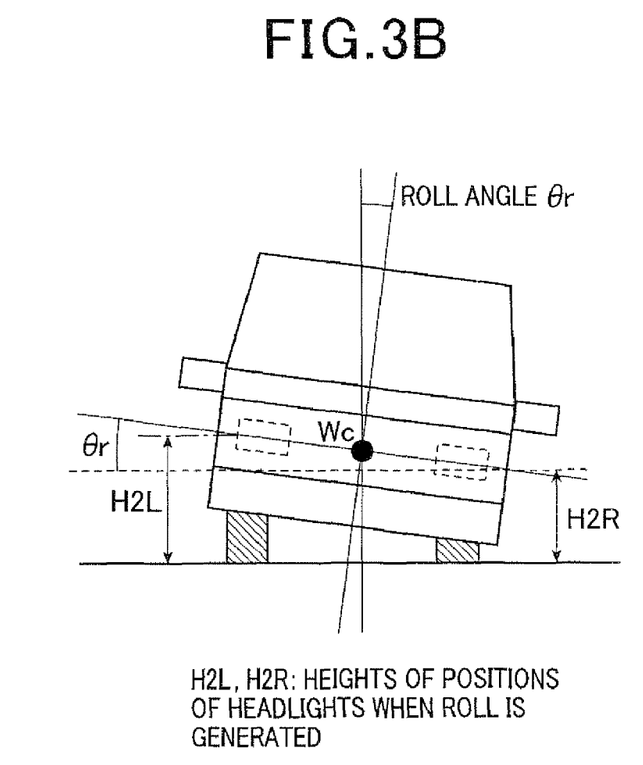
FIG. 3B is a diagram schematically showing the vehicle viewed from the rear side thereof when inclination (roll) of the vehicle is generated in the left-right direction.

Hereinafter, the processes in steps S140 and S150 will be described with reference to FIGS. 3A and 3B. FIG. 3A is a diagram schematically showing the vehicle viewed from the rear side thereof when inclination (roll) of the vehicle is not generated in the left-right direction. FIG. 3B is a diagram schematically showing the vehicle viewed from the rear side thereof when inclination (roll) of the vehicle is generated in the left-right direction In the following description, as shown in FIGS. 3A and 3B, the position of the center of gravity of the vehicle when viewed from the rear side thereof is defined as Wc, the distance between the center of the left headlight 20a and the center of the right headlight 20b is defined as W, the height of the positions of the headlights 20a and 20b when roll is not generated is defined as H1, the height of the position (the center position) of the left headlight 20a when roll is generated is defined as H2L, the height of the position (the center position) of the right headlight 20b when roll is generated is defined as H2R, and the roll angle is defined as $\theta r$. In the present embodiment, the control for inclining the optical axes of the headlights in the horizontal direction is not considered for simplicity.

As shown in FIG. 3B, the vehicle height H2L in the course of rolling is expressed as follows:

$$H2L-H2R=W\times\cos(\theta_r) \quad (1)$$

Since the vehicle-height sensors 11 of the light control apparatus 1 are disposed in the vicinity of the right front wheel and the right rear wheel, respectively, the pitch angle of the right side of the vehicle can be detected. Therefore, the height H2R of the position of the right headlight 20b with respect to the road surface is expressed as follows:

$$H2R=HF\times(-L)\times\cos(\theta_P) \quad (2)$$

where HF is the vehicle height of the front side, $\theta p$ is a pitch angle, and L is the distance between the front axle shaft and the headlights 20a and 20b (the distance in the front-back direction).

The illumination distance of the headlights 20a and 20b can be calculated by the following expression (3), $$LE=H/\tan(-\theta_P\times\pi/180) \quad (3)$$

where H is the height of the positions of the headlights 20a and 20b and LE is the illumination distance.

The above expression (3) is applied to the left headlight 20a and the right headlight 20b so that the headlights 20a and 20b have the same target illumination distance.

In this case, the target illumination distance LE may be the shorter or longer distance between the illumination distance of the left headlight 20a and the illumination distance of the right headlight 20b when the roll correction is not performed. Alternatively, the target illumination distance LE may be an intermediate value between the illumination distance of the left headlight 20a and the illumination distance of the right headlight 20b when the roll correction is not performed.

When the target illumination distance LE is determined and the control amounts (angles) by which the optical axes of the left headlight 20a and the right headlight 20b are inclined in the vertical direction are defined as $\theta L$ and $\theta R$, respectively, the following expression (4) is obtained.

$$LE=H2L/\tan((-\theta_P+\theta L)\times\pi/180)=H2R/\tan((-\theta_P+\theta R)\times\pi/180) \quad (4)$$

The control amounts for the optical axes are determined by solving the equation (4) regarding $\theta L$ and $\theta R$. The determined values are angles of the optical axes to be indicated to the headlights 20a and 20b.

When the computing section 10 determines that the vehicle is not in the course of turning (S120: NO), in step S160, the computing section 10 calculates the control amounts for the optical axes in the same manner as in the conventional method.

When the control amounts for the optical axes are obtained in steps S150 and S160, in step S170, the computing section 10 determines whether or not the light switch 15 is in the ON state. When the light switch 15 is in the ON state (S170: YES), in step S180 (leveling output means, swivel output means), the computing section 10 transmits the control amounts for the optical axes (control commands) to the left headlight 20a and the right headlight 20b (vertical-direction controllers 21a and 21b and horizontal-direction controllers 22a and 22b), and completes the light control process. When the light switch 15 is in the OFF state (S170: NO), the computing section 10 completes the light control process immediately.

Figure 4A:
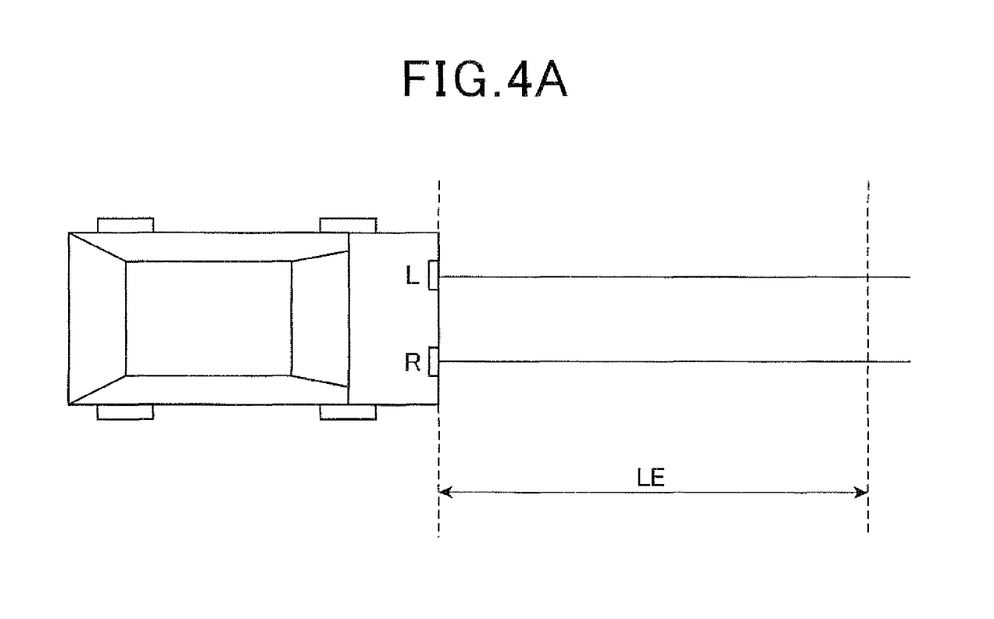
FIGS. 4A and 4B are diagrams showing the directions of optical axes after the optical axes are controlled.
Figure 4B:
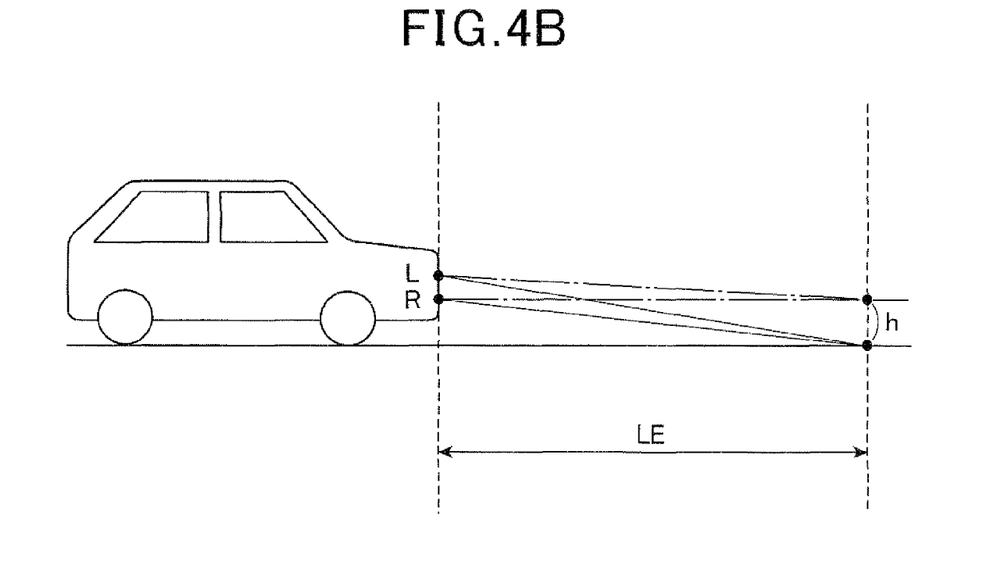

In consequence of the light control process, even when the heights of the positions of the left headlight 20a and the right headlight 20b are different from each other, as shown by solid lines in FIGS. 4A and 4B, predetermined illumination distances of the headlights 20a and 20b are controlled to become equal to each other. In FIG. 4B, although the illumination is targeted on the road surface as shown by solid lines, the illumination may be targeted on points at a height of "h" above the road surface as shown by long dashed short dashed lines.

In the light control apparatus 1 described above, the computing section 10 performs the light control process in which the computing section 10 detects the positions of the headlights 20a and 20b with respect to the road surface, and calculates the directions of the optical axes of the headlights 20a and 20b, individually, so that the optical axes are directed to the illumination targets positioned at a predetermined distance from the detected positions of the headlights 20a and 20b. Furthermore, the computing section 10 outputs control commands based on the calculation results to the vertical-direction controllers 21a and 21b which control the directions of the optical axes of the headlights 20a and 20b in the vertical direction, respectively.

According to the light control apparatus 1, since the positions of the headlights 20a and 20b with respect to the road surface are detected, and the directions of the optical axes are set depending on the positions of the headlights 20a and 20b, even when the vehicle is inclined in the left-right direction, the generation of the difference between the illumination distances of the left headlight 20a and the right headlight 20b can be prevented. Therefore, driver discomfort due to the difference between the heights of the optical axes of the left headlight and the right headlight can be prevented.

Furthermore, the computing section 10 estimates the vehicle heights at the wheels based on the detected result of the yaw rate sensor 14 which detects angular velocity when the vehicle turns, and detects the roll angle based on the estimated vehicle heights.

According to the light control apparatus 1, a roll angle can be detected by using a yaw rate sensor, which has been provided in many conventional vehicles, without disposing the vehicle-height sensors 11 for detecting the roll angle. Therefore, the light control apparatus 1 can be inexpensively manufactured.

In addition, the computing section 10 detects a pitch angle, which is the inclination of the vehicle with respect to the front-back direction, and determines displacements of the left headlight 20a and the right headlight 20b in the vertical direction based on the pitch angle. The computing section 10 then determines the positions of the left headlight 20a and the right headlight 20b based on the displacements.

According to the light control apparatus 1, the directions of the optical axes of the left headlight 20a and the right headlight 20b can be set in consideration of the pitch angle of the vehicle.

Furthermore, the light control apparatus 1 detects the pitch angle based on the detection results of the multiple vehicle-height sensors 11 which are disposed in the vicinity of a front wheel and a rear wheel, respectively, and detect vehicle heights at the positions in the vicinity of the wheels where the vehicle-height sensors 11 are disposed.

According to the light control apparatus 1, vehicle-height sensors which have been conventionally used for the leveling control (the control of the optical axes of the left headlight and the right headlight in the vertical direction) can be used to detect the pitch angle.

(Second Embodiment)

Hereinafter, a light control apparatus 2 according to a second embodiment of the present invention will be described. The light control apparatus 2 of the second embodiment differs from the light control apparatus 1 of the first embodiment in that the control of the axes of the headlights 20a and 20b in the horizontal direction is considered. In the following description, the same reference numerals as of the light control apparatus 1 of the first embodiment denote the same parts of the light control apparatus 2.

Figure 5A:
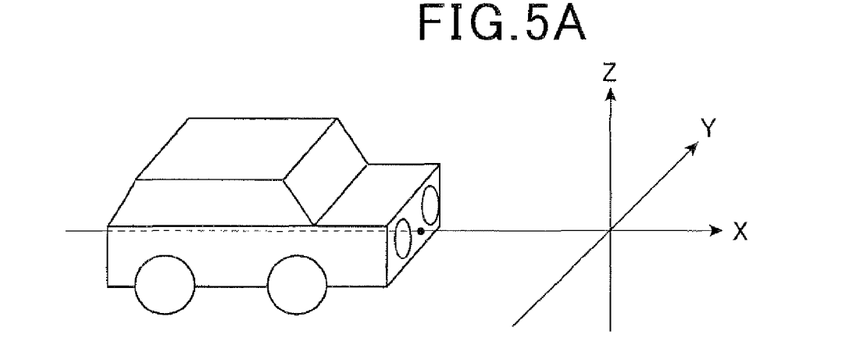
FIG. 5A is a diagram showing how coordinate axes are defined according to a second embodiment of the present invention.
Figure 5B:
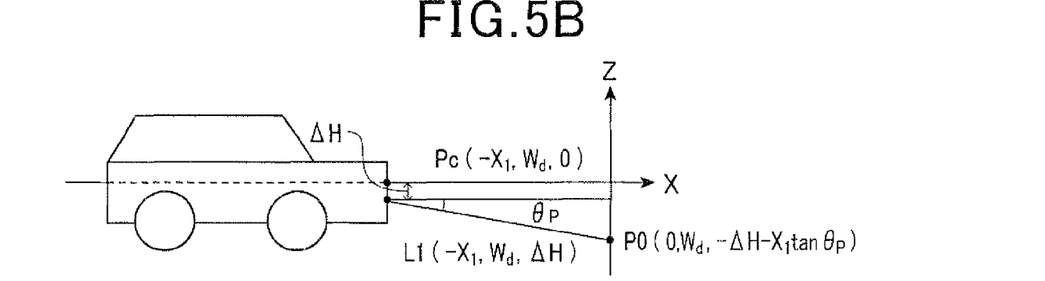
FIG. 5B is a diagram showing coordinates to which an optical axis reaches when swivel control is not performed.
Figure 5C:
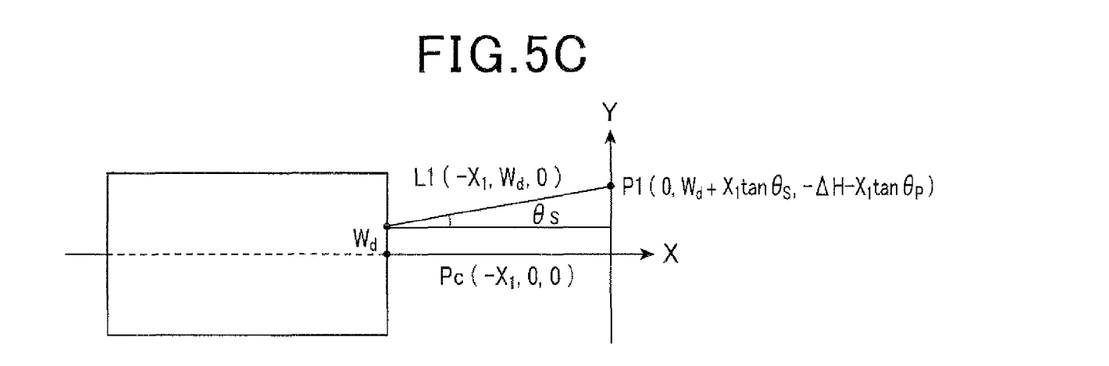
FIG. 5C is a diagram showing coordinates to which an optical axis reaches when swivel control is performed.
Figure 5D:
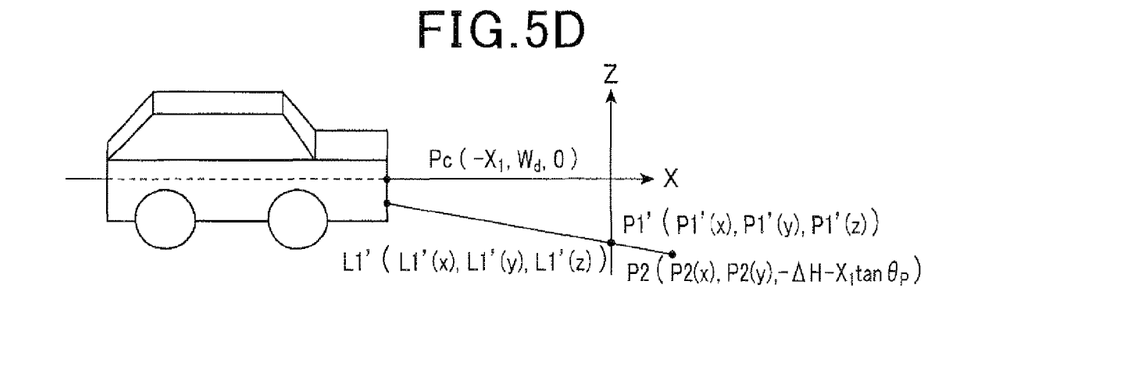
FIG. 5D is a diagram schematically showing a process for correcting the direction of an optical axis.

Processes in steps S140 and S150 (swivel correction means) of a light control process of the second embodiment will be described with reference to FIGS. 5A to 5D. FIG. 5A is a diagram showing how coordinate axes are defined. FIG. 5B is a diagram showing coordinates to which an optical axis reaches when the swivel control is not performed. FIG. 5C is a diagram showing coordinates to which an optical axis reaches when the swivel control is performed. FIG. 5D is a diagram schematically showing a process for correcting the direction of an optical axis.

In the following description, the calculation for setting the illumination distance of the left headlight 20a will be described. The calculation for setting the illumination distance of the right headlight 20b can be performed as in the case of the left headlight 20a. Each parameter of the optical axis of the right headlight 20b is set so that the illumination distance of the right headlight 20b is equal to the illumination distance of the left headlight 20a.

In the present embodiment, the coordinate system used for setting the direction of the optical axis (control amount for the optical axis) is defined as shown in FIG. 5A. The X-axis passes through the center of gravity of the vehicle in the front-back direction of the vehicle. The Y-axis is in the horizontal direction of the vehicle. The Z-axis is in the vertical direction of the vehicle. Note that, at the present time, it is assumed that the vehicle does not incline with respect to the X-Y plane. The Y-axis is positioned at an illumination distance $X_1$ of the headlights 20a and 20b from the headlights 20a and 20b.

The coordinates of the center of gravity of the vehicle (hereinafter, simply referred to as "the center of gravity") on the $X=-X_1$ plane is defined as Pc $(-X_1, 0, 0)$. The difference between the height of the center of gravity and the height of the center of the headlight is defined as $\Delta H$. The angle of the optical axis of the headlight, which inclines in the vertical direction, with respect to the horizontal plane is defined as $\theta P$. The distance on the X-Y plane between the center of the headlight and the center of rolling of the vehicle is defined as Wd. In this case, the coordinates of the position of the optical axis on the Y-Z plane is defined as P0 $(0, \text{Wd}, -\Delta H - X_1 \tan \theta_P)$, as shown in FIG. 5B.

Since the distance between the headlight and the Y-Z plane (the plane defined by X=0) is defined as the illumination distance $X_1$, when assuming that the height of the optical axis is equal to the height of the road surface at the illumination distance $X_1$, it can be considered that a plane defined as "$Z=-\Delta H - X_1 \tan \theta_P$" corresponds to the road surface.

Furthermore, when assuming that the optical axis of the headlight swivels (inclines in the horizontal direction) at $\theta_S$, the coordinates of the position of the optical axis on the Y-Z plane is defined as P1 $(0, \text{Wd}+X_1 \tan \theta_S, -\Delta H - X_1 \tan \theta_P)$, as shown in FIG. 5C.

Subsequently, the coordinates of the position of the optical axis when the roll is generated is discussed. Hereinafter, the coordinates when the vehicle rotates at a roll angle φ about the X-axis will be calculated by using a coordinate transform matrix. The coordinate transform matrix is expressed as follows:

$$Rx = \begin{pmatrix} 1 & 0 & 0 \\ 0 & \cos\phi & -\sin\phi \\ 0 & \sin\phi & \cos\phi \end{pmatrix} \quad (5)$$

Hence, coordinates L1' of the headlight when the roll is generated is expressed as follows:

$$L1' = L1 \times Rx = \begin{pmatrix} L1'(x) \\ L1'(y) \\ L1'(z) \end{pmatrix} \quad (6)$$

The coordinates P1' of the position of the optical axis on the Y-Z plane when the roll is generated is expressed as follows:

$$P1' = P1 \times Rx = \begin{pmatrix} P1'(x) \\ P1'(y) \\ P1'(z) \end{pmatrix} \quad (7)$$

As described above, it can be considered that a plane defined as "$Z=-\Delta H-X_1 \tan \theta_P$" corresponds to the road surface.

Coordinates P2 on the plane can be expressed as P2(P2(x), P2(y), $-\Delta H-X_1 \tan \theta_P$). Since P2 exists on the line passing through L1' and P1', the following relationship is established.

Coordinates $P2=L1'+k \times L1'P1'$(a vector connecting $L1'$ and $P1'$) (8)

Since the coordinates of L1' and P1' have been determined and the Z-coordinate of P2 has also been determined, k, P2(x), and P2(y) can be determined. Hence, the coordinates of P2 have been calculated.

Subsequently, when the roll is generated, the distance on the X-Y plane between the position L1' of the headlight and the coordinates P2 of the optical axis is defined as the illumination distance $X_2$. In this case, based on the following expressions (9) and (10), the following expression (11) is obtained.

$$L1'=(L1'(x), L1'(y), L1'(z)) \quad (9)$$

$$P2=(P2(x), P2(y)-\Delta H-X_1 \tan \theta_P \quad (10)$$

$$X_2=\sqrt{[L1'(x)-P2(x)]^2+\{L1'(y)-P2(y)\}^2} \quad (11)$$

In order to cancel the change in the illumination distance due to the roll, the angle of the optical axis is changed from $\theta_P$ to $\theta_P'$. At this time, the angle of the optical axis may be controlled by calculating $\theta_P'$ so that the illumination distance $X_2$ becomes equal to $X_1$ (which is the illumination distance when the roll is not generated).

According to the above calculation, the illumination distance of the left headlight 20a can agree with the target distance $X_1$.

In the calculation process of the present embodiment, the influence of the pitch angle is not considered. However, when performing the accurate calculation in consideration of the pitch angle, the coordinates L1 of the position of the headlight and the coordinates P0 of the position of the optical axis may be corrected based on the calculation process described in the first embodiment before the above calculation is performed. Thereby, the control amount for the optical axis in consideration of the pitch angle can be calculated as in the case of the first embodiment.

According to the light control apparatus 2 of the second embodiment described above, the horizontal-direction controllers 22a and 22b, which control the directions of the optical axes of the headlights 22a and 22b in the horizontal direction, are provided with swivel control functions, which output control commands depending on the detection result of the steering angle sensor 13, which detects the steering angle of the vehicle. The computing section 10 detects changes in the angles of the optical axes in the vertical direction generated based on the control commands (swivel control) by the horizontal-direction controllers 22a and 22b. The computing section 10 then corrects the control amounts of the leveling control so that the changes in the angles of the optical axes become zero.

According to the light control apparatus 2, even when the vehicle inclines in the left-right direction while the horizontal-direction controllers 22a and 22b operate (that is, while the directions of the optical axes of the headlights are controlled in the horizontal direction), and therefore the optical axes, which are intended to incline only in the horizontal direction, are inclined in the vertical direction, the displacements of the optical axes in the vertical direction (the changes in angle) can be canceled. Therefore, even when the function is provided which controls the directions of the optical axes of the headlights in the horizontal direction, the directions of the optical axes can be controlled more accurately.

In addition, the computing section 10 detects a roll angle, which is the inclination of the vehicle with respect to the left-right direction, and determines the positions of the headlights 20a and 20b based on the detected roll angle, the previously detected position of the center of gravity of the vehicle with respect to the road surface, and the distances between the position of the center of gravity and the headlights 20a and 20b.

According to the light control apparatus 2, the positions of the headlights 20a and 20b can be reliably detected based on the amounts of movement of the headlights 20a and 20b when the headlights 20a and 20b turn around the position of the center of gravity.

In the above embodiment, vehicle heights at the wheels are estimated based on the detection result of the yaw rate sensor 14, and a roll angle is determined based on the estimated vehicle heights. However, the roll angle may be directly determined based on the detection results of the multiple vehicle-height sensors 11 (which have functions for detecting vehicle heights at the positions of the wheels) disposed in the vicinity of the left and right wheels.

Hereinafter, aspects of the above-described embodiments will be summarized.

In the light control apparatus of the embodiment, the position detecting means detects positions of the headlights with respect to a road surface. The optical axis direction calculating means calculates the directions of the optical axes of the headlights, individually, so that the optical axes are directed to illumination targets positioned at predetermined distances from the positions of the headlights detected by the position detecting means. The leveling control means controls the directions of the optical axes of the headlights in the vertical direction, individually. The leveling output means outputs a control command based on a calculation result of the optical axis direction calculating means to the leveling control means.

According to the light control apparatus, the positions of the headlights with respect to the road surface are detected, and the directions of the optical axes are set depending on the positions of the headlights. In consequence, even when the vehicle is inclined in the left-right direction, a difference between the illumination distances of the left and right headlights is prevented, thereby preventing the driver of the so vehicle from feeling discomfort due to the difference between heights of the optical axes of the left and right headlights.

In the light control apparatus, as a specific configuration of the position detecting means, the roll angle detecting means may be included which detects a roll angle, which is an inclination of the vehicle with respect to the left-right direction. The position detecting means may determine positions of the headlights based on the roll angle detected by the roll angle detecting means, the position of the center of gravity of the vehicle with respect to the road surface, and distances between the position of the center of gravity and the headlights.

According to the light control apparatus, the positions of the headlights can be reliably detected based on the amounts of movement of the headlights when the headlights turn around the position of the center of gravity.

In the light control apparatus, the roll angle may be determined based on the detection results of multiple vehicle-height detecting means (which have functions for detecting vehicle heights at the positions of the wheels) disposed in the vicinity of the left and right wheels. However, the roll angle detecting means may estimate vehicle heights at wheels of the vehicle based on a detection result of the angular velocity detecting means, which detects angular velocity when the vehicle turns, and may detect the roll angle based on the estimated vehicle heights.

According to the light control apparatus, the roll angle can be detected by using the angular velocity detecting means, which has been provided in many conventional vehicles, without disposing the vehicle-height detecting means. Therefore, the light control apparatus can be inexpensively manufactured.

The roll angle may be determined by multiplying a power (e.g. the square) of the detection result of the angular velocity detecting means by a predetermined coefficient (e.g. a value theoretically or experimentally determined from the weight of the vehicle, the position of the center of gravity of the vehicle, or the like). A steering angle, a traveling speed, or the like may be used when determining the roll angle.

In the light control apparatus, the position detecting means may include the pitch angle detecting means that detects a pitch angle, which is an inclination of the vehicle with respect to the front-back direction, and the vertical displacement detecting means that determines displacements of the headlights in the vertical direction based on the pitch angle. The position detecting means may determine the positions of the headlights based on the displacements determined by the vertical displacement detecting means.

According to the light control apparatus, the directions of the optical axes of the headlight can be set in consideration of the pitch angle of the vehicle.

In the light control apparatus, the pitch angle detecting means may include the vehicle-height sensors, which are disposed in the vicinity of the front wheel and the rear wheel of the vehicle, respectively, and detect vehicle heights at the positions in the vicinity of the wheels where the vehicle-height sensors are disposed. The pitch angle detecting means may detect the pitch angle based on detection results of the vehicle-height sensors.

According to the light control apparatus, vehicle-height sensors which have been conventionally used for the leveling control (the control of the optical axes of the headlights in the vertical direction) can be used to detect the pitch angle.

In the light control apparatus, when the swivel control means, which controls the directions of the optical axes of the headlights in the horizontal direction, are provided with the swivel output means, which outputs a control command depending on a detection result of the steering angle detecting means, which detects a steering angle of the vehicle, the optical axis direction calculating means may include a swivel correction means that detects a change in the angle of the optical axis in the vertical direction generated by the control command of the swivel control means and may correct a control amount of the leveling control means so that the change in the angle is canceled.

According to the light control apparatus, even when the vehicle inclines in the left-right direction while the swivel control means operates (that is, while the direction of the optical axis of the headlight is controlled to change in the horizontal direction from a state in which the optical axis is directed straight ahead of the vehicle), and therefore the optical axis, which is intended to incline only in the horizontal direction, is inclined in the vertical direction, the displacement of the optical axis in the vertical direction (the change in angle) can be canceled. Therefore, even when the function is provided which controls the direction of the optical axis of the headlight in the horizontal direction, the direction of the optical axis can be controlled more accurately.

The light control program allows a computer to function as means described above configuring the light control apparatus.

According to the light control program, the same advantages can be provided as those of the light control apparatus.

It will be appreciated that the present invention is not limited to the configurations described above, but any and all modifications, variations or equivalents, which may occur to those who are skilled in the art, should be considered to fall within the scope of the present invention.

What is claimed is:

1. A light control apparatus for controlling directions of optical axes of headlights mounted in a vehicle, comprising:
  a position detecting section that detects positions of the headlights with respect to a road surface;
  an optical axis direction calculating section that calculates the directions of the optical axes of the headlights, individually, so that the optical axes are directed to illumination targets positioned at predetermined distances from the positions of the headlights detected by the position detecting section;
  a leveling control section that controls the directions of the optical axes of the headlights in the vertical direction, individually;
  a leveling output section that outputs a control command based on a calculation result of the optical axis direction calculating section to the leveling control section;
  a swivel control section that controls the directions of the optical axes of the headlights in the horizontal direction, individually;
  a steering angle detecting section that detects a steering angle of the vehicle; and
  a swivel output section that outputs control commands based on a detection result of the steering angle detecting section, wherein
  the optical axis direction calculating section comprises a swivel correction section that detects changes in the angles of the optical axes in the vertical direction generated due to operation of the swivel control section and corrects control amounts of the leveling control section so that the changes in the angles are canceled.

2. The apparatus according to claim 1, wherein
  the position detecting section comprises a roll angle detecting section that detects a roll angle, which is an inclination of the vehicle with respect to the left-right direction, and
  the position detecting section determines positions of the headlights based on the roll angle detected by the roll angle detecting section, a position of the center of gravity of the vehicle with respect to the road surface, and distances between the position of the center of gravity and the headlights.

3. The apparatus according to claim 2, further comprising an angular velocity detecting section that detects angular velocity when the vehicle turns, wherein
  the roll angle detecting section estimates vehicle heights at wheels of the vehicle based on a detection result of the angular velocity detecting section, and detects the roll angle based on the estimated vehicle heights.

4. The apparatus according to claim 1, wherein the position detecting section comprises a pitch angle detecting section that detects a pitch angle, which is an inclination of the vehicle with respect to the front-back direction, and a vertical displacement detecting section that determines displacements of the headlights in the vertical direction based on the pitch angle, and the position detecting section determines the positions of the headlights based on the displacements determined by the vertical displacement detecting section.

5. The apparatus according to claim 4, wherein the pitch angle detecting section comprises vehicle-height sensors, which are disposed in the vicinity of a front wheel and a rear wheel of the vehicle, respectively, and detect vehicle heights at the positions in the vicinity of the wheels where the vehicle-height sensors are disposed, and the pitch angle detecting section detects the pitch angle based on detection results of the vehicle-height sensors.

6. A light control apparatus for controlling directions of optical axes of headlights mounted in a vehicle, comprising:
a position detecting means for detecting positions of the headlights with respect to a road surface;
an optical axis direction calculating means for calculating the directions of the optical axes of the headlights, individually, so that the optical axes are directed to illumination targets positioned at predetermined distances from the positions of the headlights detected by the position detecting means;
a leveling control means for controlling the directions of the optical axes of the headlights in the vertical direction, individually;
a leveling output means for outputting a control command based on a calculation result of the optical axis direction calculating means to the leveling control means;
a swivel control means for controlling the directions of the optical axes of the headlights in the horizontal direction, individually;
a steering angle detecting means for detecting a steering angle of the vehicle; and
a swivel output means for outputting control commands based on a detection result of the steering angle detecting means, wherein
the optical axis direction calculating means comprises a swivel correction means for detecting changes in the angles of the optical axes in the vertical direction generated due to operation of the swivel control means and corrects control amounts of the leveling control means so that the changes in the angles are canceled.

7. A non-transitory computer readable recording medium in which a light control program for controlling directions of optical axes of headlights mounted in a vehicle is recorded to allow a computer to function as:

a position detecting means for detecting positions of the headlights with respect to a road surface;
an optical axis direction calculating means for calculating the directions of the optical axes of the headlights, individually, so that the optical axes are directed to illumination targets positioned at predetermined distances from the positions of the headlights detected by the position detecting means;
a leveling control means for controlling the directions of the optical axes of the headlights in the vertical direction, individually;
a leveling output means for outputting a control command based on a calculation result of the optical axis direction calculating means to the leveling control means;
a swivel control means for controlling the directions of the optical axes of the headlights in the horizontal direction, individually;
a steering angle detecting means for detecting a steering angle of the vehicle; and
a swivel output means for outputting control commands based on a detection result of the steering angle detecting means, wherein
the optical axis direction calculating means comprises a swivel correction means for detecting changes in the angles of the optical axes in the vertical direction generated due to operation of the swivel control means and corrects control amounts of the leveling control means so that the changes in the angles are canceled.

8. A method of controlling directions of optical axes of headlights mounted in a vehicle, the method comprising:
detecting positions of the headlights with respect to a road surface;
calculating the directions of the optical axes of the headlights, individually, so that the optical axes are directed to illumination targets positioned at predetermined distances from the detected positions of the headlights;
controlling the directions of the optical axes of the headlights in the vertical direction, individually;
generating a control command based on the calculated directions of the optical axes of the headlights;
controlling the directions of the optical axes of the headlights in the horizontal direction, individually;
detecting a steering angle of the vehicle; and
generating control commands based on the detected steering angle; wherein
said calculating the directions of the optical axes of the headlights comprises detecting changes in the angles of the optical axes in the vertical direction generated due to control of the directions of the optical axis direction in the horizontal direction and correcting control amounts in controlling the directions of the optical axes of the headlights in the vertical direction so that the changes in the angles are canceled.

* * * * *